Dec. 25, 1956   R. F. PETRICK   2,775,174
SOIL TREATING AND WEED DESTROYING APPARATUS
Filed Dec. 1, 1950   3 Sheets-Sheet 1
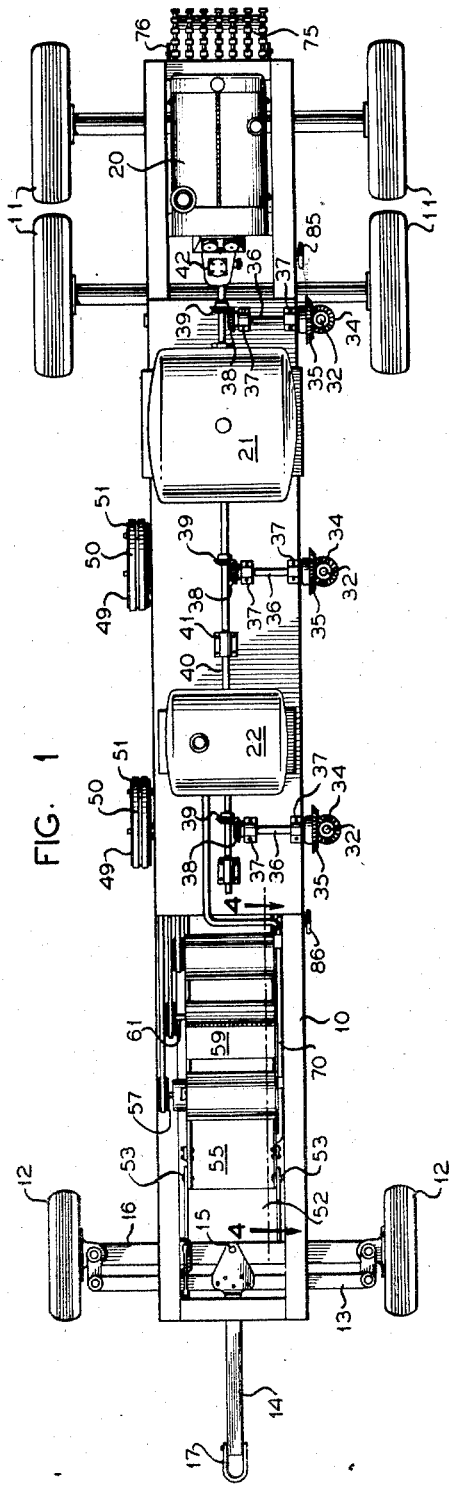
INVENTOR.
R. F. PETRICK
BY
A. Yates Dowell
ATTORNEY

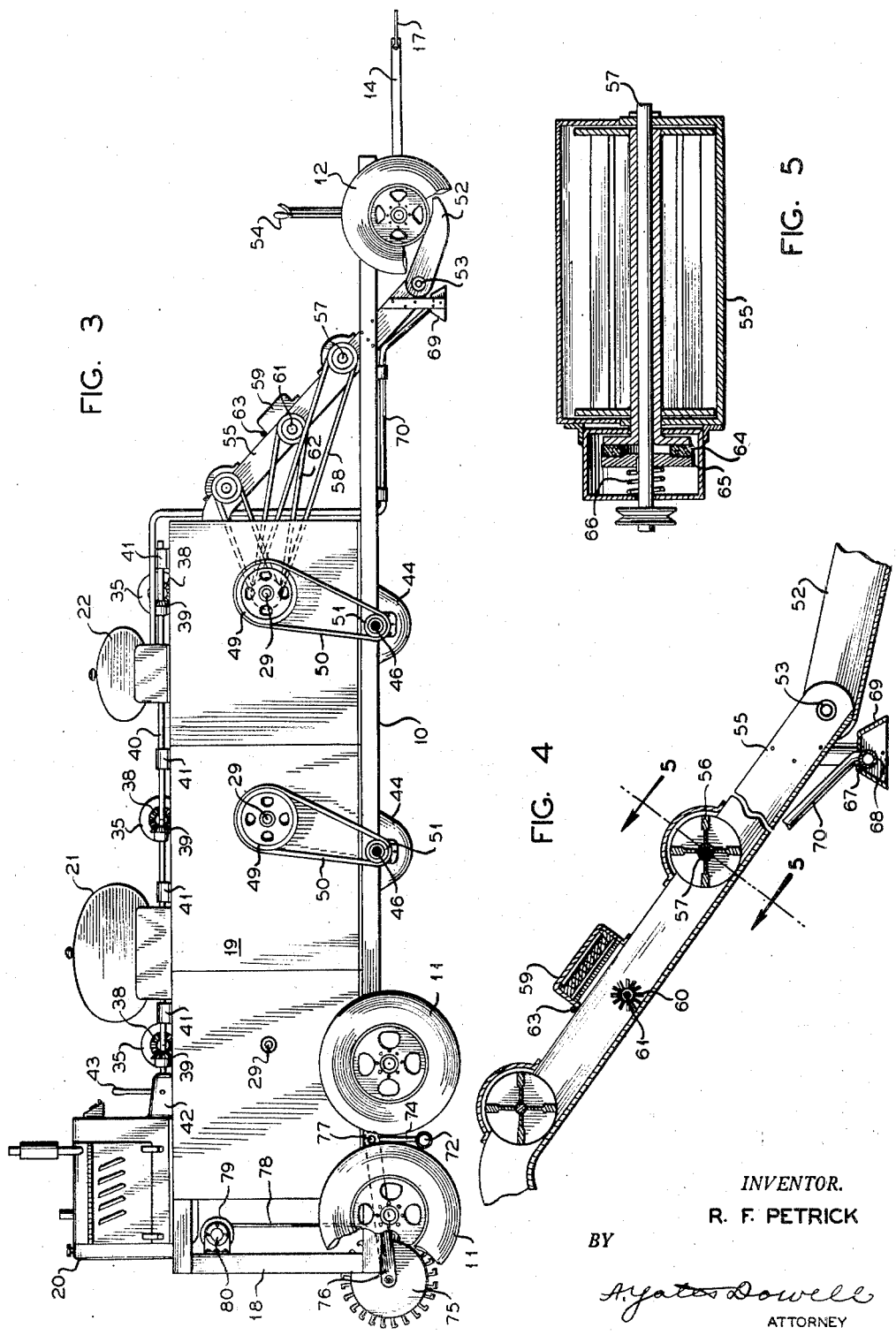

Dec. 25, 1956   R. F. PETRICK   2,775,174
SOIL TREATING AND WEED DESTROYING APPARATUS
Filed Dec. 1, 1950   3 Sheets-Sheet 3
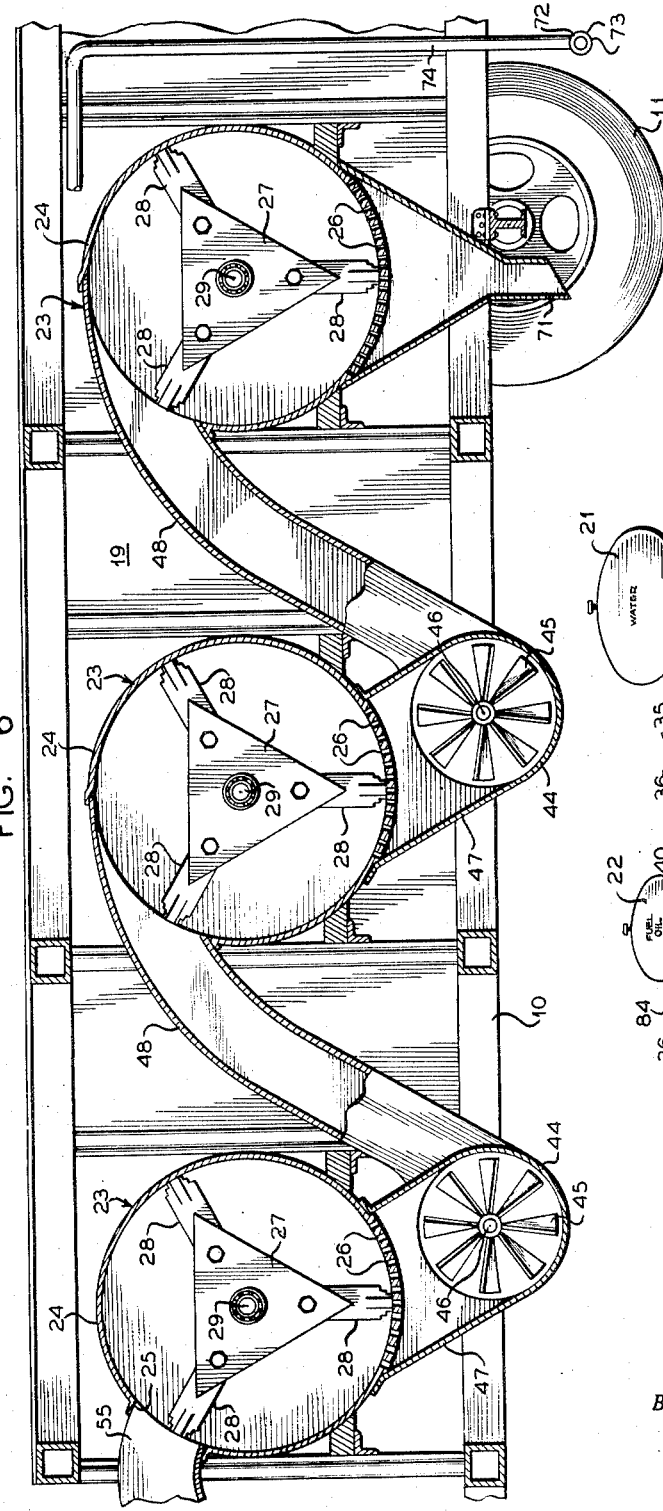
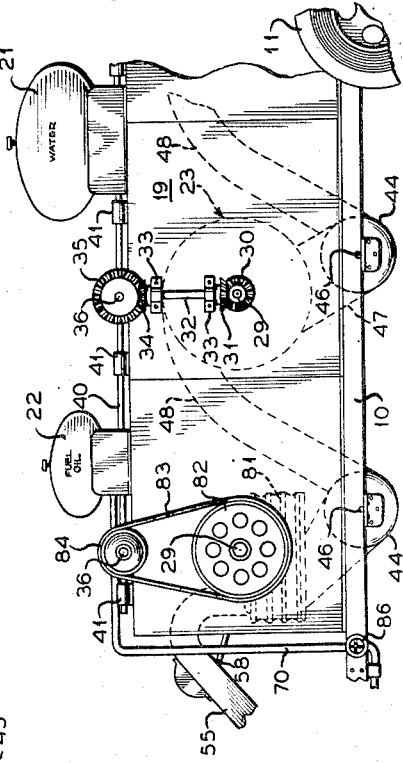
INVENTOR.
R. F. PETRICK
BY
ATTORNEY

United States Patent Office 2,775,174
Patented Dec. 25, 1956

2,775,174

SOIL TREATING AND WEED DESTROYING APPARATUS

Richard F. Petrick, Ellsworth, Kans.; Charles H. Everett, guardian of said Richard F. Petrick, incompetent Application December 1, 1950, Serial No. 198,575

3 Claims. (Cl. 97—10)

This invention relates to agriculture and, more particularly, to an apparatus for treating the soil and for destroying any weed seeds which may be deposited in the soil and also for destroying any standing growth of weeds.

Briefly stated, the invention contemplates the provision of an apparatus in the form of a vehicle which may be towed over the ground to be treated by a tractor or other suitable means and in which a relatively thin section of the surface of the soil is removed and passed through the machine. This soil is comminuted or pulverized in order to destroy weed seeds which may be present therein and also in order to destroy any standing growth of weeds which may be carried to the machine with this soil and further in which the soil is deposited on the earth after passage through the machine, there being provision for moistening this earth and rolling the same with a sheep's foot roller in order to restore the surface of the ground to substantially the same condition as before treatment by the apparatus. There is also provided a burning means in the form of a torch which serves to destroy standing weed growth and the roots emanating therefrom and in order to make the apparatus entirely self-contained there is provided on the chassis thereof a power means in the form of an internal combustion engine or other suitable means which serves to drive the necessary conveying and comminuting means incorporated in the apparatus, and, if desired, suitable remote controls may be provided on the towing tractor or other vehicle in order to completely control the operation of the apparatus of this invention.

It is therefore an object of this invention to provide a soil-treating and weed-destroying apparatus in which means is provided for removing a portion of the top soil which is comminuted or pulverized in order to destroy the weed seeds present therein and also any standing weed growth and to deposit this soil on the ground in substantially the same condition as when removed.

It is a further object of this invention to provide a soil-treating and weed-destroying apparatus in which means is included for burning any standing growth of weeds which may be present in the ground to be treated.

It is a further object of this invention to provide a soil-treating and weed-destroying apparatus in the form of a vehicle to be towed over the ground to be treated and in which means is provided for moistening the earth treated by the apparatus and for compacting the same in order to facilitate further tillage thereof.

It is a further object of this invention to provide a soil treating and weed-destroying apparatus in which means is provided to remove any metal particles which may be present in the soil prior to treatment of the soil in the apparatus of this invention.

It is a further object of the invention to provide a soil-treating and weed-destroying apparatus in which means is provided for crushing rocks and stones which may be present in the soil in order to render the area treated more suitable to agricultural operations.

It is a further object of the invention to provide a soil-treating and weed-destroying apparatus in the form of a vehicle which is entirely self-contained and in which power means is provided for operating the mechanism apparatus and which may be operated by one person controlling the towing vehicle, such as a tractor or the like, and, if necessary, controlling the operation of the apparatus of this invention through the medium of remote controls.

Further objects and advantages of the invention will be apparent from the following description taken in conjunction with the accompanying drawings wherein:

Fig. 1 is a top plan view of the apparatus of this invention;

Fig. 2, a side elevational view of the apparatus shown in Fig. 1;

Fig. 3, a side elevational view taken from the opposite side to that shown in Fig. 2 and showing details of the drive means for various portions of the apparatus;

Fig. 4, a fragmentary sectional view showing the details of the earth moving means, the weed burner and the means for removing metallic particles from the earth passing through the apparatus;

Fig. 5, a sectional view taken on the line 5—5 of Fig. 4 and showing the details of the conveying means for moving the earth into the apparatus of this invention;

Fig. 6, a fragmentary longitudinal sectional view showing the construction of the soil pulverizing and weed seed destroying apparatus of this invention; and Fig. 7, a fragmentary side elevational view showing the apparatus of this invention incorporating a rock-crushing mechanism in order to reduce stones or rocks in the area to be treated to relatively small particles in order that they may pass through the apparatus of this invention.

With continued reference to the drawing, there is shown a soil-treating and weed-destroying apparatus comprising a chassis 10 having rear ground-engaging wheels 11 and front steerable wheels 12. The front wheels 12 are connected by a tie bar 13 which is suitably connected to a draw bar 14 pivotally mounted at 15 on the axle 16, the draw bar 14 having a coupling means 17 for connection to the towing vehicle such as a tractor or other suitable means.

Mounted on the chassis 10 is an upstanding framework 18 which serves to support a housing 19 within which is disposed the soil-pulverizing apparatus, the details of which will be later described.

Framework 18 also serves to support a power means in the form of an internal combustion engine or the like 20, a water tank 21 and a fuel tank 22 for a burner which is utilized for destroying the weeds in the path of movement of the apparatus in a manner to be presently described.

Mounted within the housing 19 are a series of hammer mills or other suitable pulverizing apparatus 23, there being three of these mills shown in the drawing, although any suitable number may, of course, be employed. These hammer mills comprise a casing 24 having an inlet opening 25 and a screen 26 providing an outlet, the size of the openings in screen 26 being graduated from large to small as the soil progresses through the apparatus, it being obvious that the soil is progressively comminuted from relatively large particles to fine particles, the latter being discharged from the apparatus to the earth over which the machine is passing. Each hammer mill 23 includes a rotor 27 having a series of knives or beater bars 28 extending radially therefrom. Each rotor 27 is mounted on a shaft 29 extending from the ends of casing 24, there being a gear 30 or other suitable drive means mounted on the end of each shaft.

Gears 30 are driven by a pinion 31 mounted on a shaft 32 which is rotatably supported by bearings 33, there being a beveled pinion 34 mounted on the opposite end of shaft 32. Pinion 34 meshes with gear 35 mounted on shaft 36 which is carried in bearings 37 supported by the framework 18, shaft 36 further having a beveled pinion 38 meshing with gear 39 mounted on drive shaft 40 extending longitudinally of the machine and rotatably supported by bearings 41. Drive shaft 40 is connected to gear box 42 mounted on the power means 20, the operation of shaft 40 being controlled by lever 43 which may be utilized to start or stop the hammer mills 23 and to control the speed thereof through suitable gear-reducing mechanism contained within the gear box 42.

Disposed beneath each hammer mill 23 is a blower 44 having a fan or impeller 45 mounted on a shaft 46 which projects from the ends of the lower casing, the blower being connected with the screen 26 of each hammer mill by means of a duct 47. Each blower 44 connects with the inlet of the succeeding hammer mill 23 by means of a duct 48, thereby transmitting comminuted earth from one hammer mill to the next.

In order to drive the fans or impellers 45 of the blowers 44 there is mounted on the hammer mill shaft 29 pulleys 49 which serve to engage belts 50, these belts in turn engaging the pulleys 51 on the shaft 46 of the blower 44 to drive the same from the common power means 20.

Earth to be treated is supplied to the apparatus by means of a scoop or plow 52 pivotally mounted at the forward end of the machine by means of pins 53, the height of scoop or plow 52 being controlled by means of a lever 54 through linkage, not shown. Plow 52 serves to deliver the earth to a ramp 55, the earth being moved up this ramp by a series of paddles 56 mounted on shafts 57 which are driven by belts 58 from shaft 29 of the front hammer mill 23. Paddles 56 rotate at a relatively slow speed and engage the earth passing up ramp 55 and serve as conveyors for this earth.

Also mounted on ramp 55 is an electro magnet 59 which may be energized from the battery and generator system of the power means 20, magnet 59 serving to attract and hold any metallic particles which may be in the earth passing up the ramp 55 whereby these metallic particles may be separated so as not to damage the blades 28 of the hammer mills 23 and also to preclude returning these metallic particles to the earth after treatment in the apparatus of this invention. In order to facilitate the operation of electro magnet 59 an agitator in the form of a paddle wheel 60 is disposed in the path of movement of earth up the ramp 55, this paddle wheel being mounted on a shaft 61 which is rotated by a belt 62 driven from the shaft 29 from the first hammer mill 23, paddle wheel 60 serving to agitate the earth immediately below the electro magnet 59 and assist in separating metallic particles therefrom. The magnet 59 is pivotally mounted at 63 on the ramp 55 and may be raised as occasion demands in order to remove metallic particles from the lower surface thereof. This operation need only be performed when the metallic particles have substantially covered the surface of the electro magnet.

The paddles 56 which serve to propel the earth up the ramp 55 are provided with means for permitting slippage between the driving means and the paddles in order to preclude damage to the machine in the event substantially sized rocks or other articles are present in the earth and which might serve to prevent rotation of the paddles 56 and, if the driving means were positive, would result in severe damage to these paddles. The structure of this driving means is best shown in Fig. 5 and comprises a friction disc 64 mounted on the shaft 57, disc 64 being engaged by a friction plate 65 which is urged into contact therewith by a compression spring 66. This, in effect, forms a friction clutch and in the event that the paddles 56 are engaged by oversized objects, the friction drive means will slip and preclude damage to such paddles at which time the operator may remove the object which blocks the same.

In order to completely destroy any standing growth of weeds in the path of movement of the apparatus of this invention, there is provided a burner in the form of a pipe 67 having a plurality of apertures 68 therein, the pipe 67 being disposed within a shield 69 which serves to direct the flame downwardly upon the surface of the ground. Pipe 67 is provided with fuel through a pipe 70 which communicates with fuel tank 22, the fuel being supplied to burner 67 either under pressure or by gravity. If pressure operation is desired, an air compressor may be incorporated as part of the power means 20 and the desired pressure maintained in the fuel tank 22.

Comminuted material is discharged from the last hammer mill 23 through a chute 71 and since it is desired to return the earth in substantially the same condition as prior to treatment by the apparatus, there is provided moistening means in the form of a transversely disposed pipe 72 having apertures 73 therein, this moistening means being supplied through a pipe 74 connected to water tank 21 mounted on the framework 18 of the apparatus. Water may be supplied in any desired quantity in order to moisten the earth sufficiently to permit suitable compacting of the same by a sheep's foot roller 75 rotatably mounted at the rear of the machine. Roller 75 is carried by arms 76 which are pivotally mounted at 77 on the chassis 10 of the apparatus and roller 75 may be raised out of operative position for transportation from one field to another by means of a cable 78 or other suitable means operated from a winding drum 79 powered by a motor 80 which may be energized from the battery and generator system of the power means 20. Obviously hand-operated raising means may be provided, if desired.

Since in many locations stones of varying sizes will be encountered and since these stones cannot pass through the hammer mills 23 of the apparatus, it is contemplated by this invention that for use in such localities a crusher 81 will be substituted for the first hammer mill 23, this crusher being of more or less conventional construction and being driven by a pulley 82 through a belt 83 engaging a second pulley 84 which in turn is driven by the power shaft 40. Crusher 81 serves to reduce stones of ordinary sizes to relatively fine particles in order that these may pass through the succeeding hammer mills 23 and their discharge screens 26 to be eventually deposited upon the earth through discharge chute 71.

In operation, the plow 52 will be set to the desired depth by adjustment of the operating handle or lever 54 and the apparatus attached to a towing vehicle such as a tractor through the draw bar 14 and coupling 17. Upon passing over the ground to be treated, the earth will be removed by plow 52 and will pass up ramp 55 under the action of paddles 56. Any metallic particles therein will be removed by electro magnet 59, the earth passing into the first hammer mill 23 or the crusher 81, as the case may be, at which location the earth will be reduced in size to particles which will pass through the discharge screen 26. From this hammer mill or crusher the earth will be propelled by blower 44 through duct 48 to the next hammer mill 23, at which location the earth will be further comminuted or reduced in size to pass through the discharge screen 26 of this hammer mill. Blower 44 connected with the second hammer mill will move the comminuted earth through the duct 48 to the final hammer mill 23 at which location the earth will be reduced to its final granular size, passing outwardly through screen 26 and chute 71 to be deposited on the ground. As the apparatus of this invention moves along, the deposited earth emerging from chute 71 will be moistened by water emanating from pipe 73 and will be compacted and rolled by the sheep's foot roller 75 which leaves the earth in good condition for subsequent tillage.

Likewise, during the operation of the apparatus, if there is a substantial standing crop of weeds, the burner 67 would be operated to burn and destroy this crop and to sear the roots to prevent regrowth thereof and during the comminuting operation in the hammer mills 23 any weed seeds which may be present in the earth are pulverized and reduced to such an extent that any subsequent sprouting of these weed seeds is precluded.

The apparatus may be made in any dimensions commensurate with the particular requirements or the area to be covered and, obviously, all of the operations thereof may be controlled by remote control means from the towing vehicle and such remote control means may be incorporated as part of the apparatus, if desired. The supply of water to the pipe 72 may be controlled by a manual valve 85 or this may conveniently be a solenoid operated valve in order to permit remote control. In a like manner, the operation of burner 67 may be controlled by a manual valve 86 or this can also be a solenoid operated valve.

The apparatus of this invention may be conveniently constructed of commercially available structural shapes and there are no particularly accurate machining operations required which would necessitate highly skilled labor for production of the same. Consequently, the apparatus may be economically constructed and therefore available at a moderate cost.

It will be obvious to those skilled in the art that various changes may be made in the invention without departing from the spirit and scope thereof and, therefore, the invention is not limited to that which is shown in the drawings and described in the specifications but only as indicated in the appended claims.

What is claimed is:

1. A soil-treating and weed-destroying apparatus comprising a chassis, ground-engaging wheels on said chassis, soil and weed seed pulverizing means comprising a plurality of hammer mills mounted on said chassis, whereby the particles of soil and weed seeds are progressively reduced in size, power means on said chassis for driving said hammer mills, a ramp on the forward end of said apparatus communicating with the inlet of the first hammer mill, a ground-engaging plow pivotally mounted on the forward end of said ramp, means to adjust the depth of cut of said plow, paddle wheels on said ramp for moving soil upwardly thereon and into said first hammer mill, a magnet on said ramp for removing metallic particles from the soil, an agitator disposed in the path of movement of the soil on said ramp adjacent to said magnet to facilitate removal of metallic particles therefrom, means for driving said paddle wheels and agitator from said power means, blowers mounted on said chassis for conveying soil from one hammer mill to the next and an outlet chute on the last hammer mill for depositing pulverized soil on the ground.

2. A soil-treating and weed-destroying apparatus comprising a chassis, ground-engaging wheels on said chassis, soil and weed seed pulverizing means comprising a plurality of hammer mills mounted on said chassis, whereby the particles of soil and weed seeds are progressively reduced in size, power means on said chassis for driving said hmamer mills, a ramp on the forward end of said apparatus communicating with the inlet of the first hammer mill, a ground-engaging plow pivotally mounted on the forward end of said ramp, means to adjust the depth of cut of said plow, paddle wheels on said ramp for moving soil upwardly thereon and into said first hammer mill, means on said ramp for removing metallic particles from the soil, an agitator disposed in the path of movement of soil on said ramp to facilitate removal of metallic particles therefrom, means for driving said paddle wheels and agitator from said power means, blowers mounted on said chassis for conveying soil from one hammer mill to the next and an outlet chute on the last hammer mill for depositing pulverized soil on the ground.

3. A soil-treating and weed-destroying apparatus comprising a chassis, ground-engaging wheels on said chassis, soil and weed seed pulverizing means comprising a plurality of hammer mills mounted on said chassis, whereby the particles of soil and weed seeds are progressively reduced in size, power means on said chassis for driving said hammer mills, a ramp on the forward end of said apparatus communicating with the inlet of the first hammer mill, a ground engaging plow mounted on the forward end of said ramp, means to adjust the depth of cut of said plow, paddle wheel means on said ramp for moving soil upwardly thereon and into said first hammer mill, means for driving said paddle wheels from said power means, means mounted on said chassis for conveying soil from one hammer mill to the next and an outlet chute on the last hammer mill for depositing pulverized soil on the ground, and screen means in the path of pulverized soil from each hammer mill, the mesh of said screen means being progressively smaller from the said one hammer mill to the said next hammer mill thereby preventing pulverized soil from the said one hammer mill from passing out of the said one hammer mill to the said next hammer mill until a predetermined degree of pulverization is obtained therein.

References Cited in the file of this patent
UNITED STATES PATENTS

| | | |
|---|---|---|
| 727,807 | King | May 12, 1903 |
| 915,110 | Pickel | Mar. 16, 1909 |
| 1,018,513 | Meyer | Feb. 27, 1912 |
| 1,063,250 | Felt | June 3, 1913 |
| 1,235,868 | Williams | Aug. 7, 1917 |
| 1,303,149 | August | May 6, 1919 |
| 1,303,150 | August | May 6, 1919 |
| 1,494,458 | Campbell | May 20, 1924 |
| 1,500,437 | Burton | July 8, 1924 |
| 1,539,640 | Brune | May 26, 1925 |
| 1,586,169 | Webb et al. | May 25, 1926 |
| 1,954,593 | Kuly | Apr. 10, 1934 |
| 2,377,496 | Hopkins | June 5, 1945 |
| 2,474,305 | Craig | June 28, 1949 |
| 2,563,926 | Elliott et al. | Aug. 14, 1951 |
| 2,602,388 | Elliott et al. | July 8, 1952 |